United States Patent
Song et al.

(10) Patent No.: US 7,382,239 B2
(45) Date of Patent: Jun. 3, 2008

(54) SYSTEM AND METHOD FOR IMPROVING RECEIVED SIGNAL STRENGTH FOR AN IN-VEHICLE WIRELESS COMMUNICATION SYSTEM

(75) Inventors: Hyok J. Song, Camarillo, CA (US); Hui-Pin Hsu, Northridge, CA (US); Richard W. Wiese, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 255 days.

(21) Appl. No.: 11/209,538

(22) Filed: Aug. 23, 2005

(65) Prior Publication Data

US 2007/0052527 A1    Mar. 8, 2007

(51) Int. Cl.
*B60C 23/00* (2006.01)

(52) U.S. Cl. .................. 340/442; 340/445; 340/447; 73/146.5; 343/711

(58) Field of Classification Search ................. 340/442
See application file for complete search history.

(56) References Cited

U.S. PATENT DOCUMENTS

| | | | |
|---|---|---|---|
| 4,163,208 A * | 7/1979 | Merz | 340/447 |
| 5,473,938 A * | 12/1995 | Handfield et al. | 73/146.5 |
| 6,400,263 B1 | 6/2002 | Kokubo | |
| 6,507,276 B1 | 1/2003 | Young et al. | |
| 6,535,116 B1 | 3/2003 | Zhou | |
| 6,581,449 B1 | 6/2003 | Brown et al. | |
| 6,885,292 B2 * | 4/2005 | Katou | 340/445 |
| 2006/0250227 A1 * | 11/2006 | Naito | 340/447 |

* cited by examiner

*Primary Examiner*—Donnie L. Crosland

(57) ABSTRACT

An onboard wireless communication system for a vehicle, such as a tire pressure monitoring system ("TPMS") is disclosed. The TPMS includes wheel-mounted radio frequency ("RF") sensor/transmitters that transmit RF signals conveying tire pressure information, at least one RF relay element, and an RF receiver coupled to a TPMS processor. The RF relay element(s) relay the RF signals from the sensor/transmitters to the RF receiver to reduce the negative effect of electromagnetic field scattering caused by conductive parts of the vehicle.

15 Claims, 3 Drawing Sheets

SYSTEM AND METHOD FOR IMPROVING RECEIVED SIGNAL STRENGTH FOR AN IN-VEHICLE WIRELESS COMMUNICATION SYSTEM

TECHNICAL FIELD

The present invention generally relates to vehicle-based wireless communication systems, and more particularly relates to a relay antenna element for use with a vehicle-based wireless communication system such as a tire pressure monitoring system.

BACKGROUND

Tire pressure monitoring systems ("TPMS") for vehicles are known in the prior art. A TPMS provides constant monitoring of tire inflation levels in all four tires of a vehicle, and a typical TPMS makes the tire inflation data available to the driver. A sensor/transmitter unit mounted on each wheel rim periodically transmits a signal conveying tire pressure information at a specified frequency to a receiver mounted elsewhere onboard the vehicle. The sensor/transmitter unit is a combination of an air pressure sensor and a radio frequency ("RF") transmitter that encodes data in a manner suitable for RF broadcasting. The receiver, which is usually located in the passenger compartment, can be integrated with (or connected to) an in-dash TPMS processor that alerts the driver if tire pressure is too low. Conventional TPMS systems are disclosed in U.S. Pat. Nos. 6,507,276, 6,535,116, 6,581,449, and 6,400,263.

In automobile deployments, there are little if any direct RF signal paths between the sensor/transmitters and the TPMS receiver due to the metal composition of the chassis. Furthermore, the sensor/transmitters and the receiver are typically mounted in close proximity to conductive metal portions of the automobile. Consequently, the body of the vehicle causes electromagnetic field scattering that can adversely impact the operating signal strength range of the TPMS, resulting in undesired deep fading in the communication link between the sensor/transmitters and the receiver. Unfortunately, increasing the RF transmit power of the TPMS signals is not a practical solution because the maximum transmit power is limited by strict government regulations. Relocating the TPMS receiver to increase received signal strength is also not a practical solution due to the existence of complex wiring harnesses in modern automobiles.

Accordingly, it is desirable to have a TPMS having improved dynamic range compared to conventional TMPSs. In addition, it is desirable to have an onboard wireless communication system for vehicle applications, where wireless signal losses between the RF transmitter and the RF receiver are reduced. Furthermore, other desirable features and characteristics of the present invention will become apparent from the subsequent detailed description and the appended claims, taken in conjunction with the accompanying drawings and the foregoing technical field and background.

BRIEF SUMMARY

An RF communication system as described herein, such as a TPMS, includes a passive RF relay element that reduces the adverse effect of field scattering, which may be caused by the conductive metal body of the vehicle. RF relay elements can be used in such systems to reduce the signal path loss between the RF transmitter(s) or wireless sensors and the RF receiver, resulting in improved performance and increased battery life of the wireless sensors. The above and other aspects of the invention may be carried out in one form by an onboard TPMS for a vehicle. The TPMS includes a wheel-mounted tire pressure sensor/transmitter configured to transmit an RF signal that conveys tire pressure information, the RF signal being susceptible to electromagnetic field scattering caused by the vehicle, and an onboard RF relay element located proximate to the wheel-mounted tire pressure sensor/transmitter, the onboard RF relay element being configured to reduce signal strength loss of the RF signal.

BRIEF DESCRIPTION OF THE DRAWINGS

The present invention will hereinafter be described in conjunction with the following drawing figures, wherein like numerals denote like elements.

DETAILED DESCRIPTION

Figure 1:
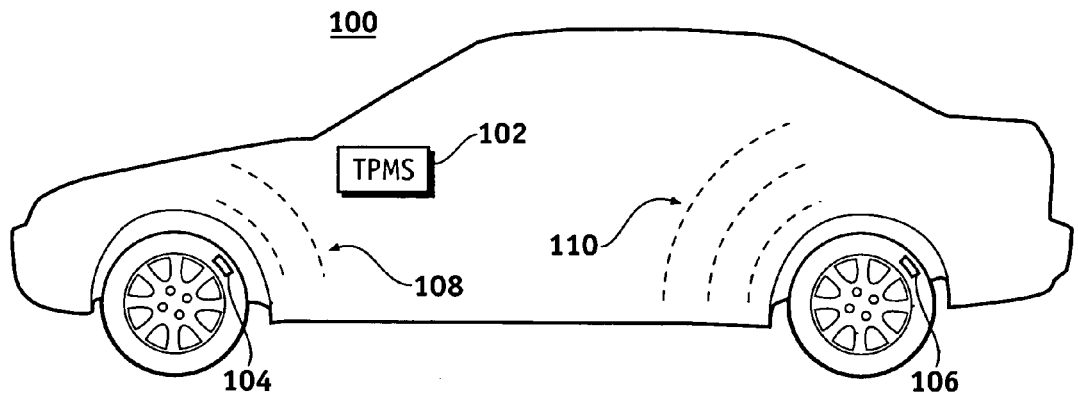
FIG. 1 is a side phantom view of a vehicle with a TPMS configured in accordance with an example embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of wireless data transmission protocols, RF communication systems, and onboard vehicle systems, and that the TPMS systems described herein are merely exemplary applications for the invention.

For the sake of brevity, conventional techniques related to tire pressure monitoring, signal processing, RF data transmission, RF antenna design, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The following description may refer to element or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically. Thus, although the figures might depict certain example arrangements of elements, additional intervening elements, devices, features, or components may be present in an actual embodiment (assuming that the functionality of the systems are not adversely affected).

The invention described herein may be embodied in connection with a number of onboard vehicle RF communication systems that rely on wireless signal transmission between at least one RF transmitter and at least one RF receiver. Such an RF communication system may include, without limitation: a TPMS; an audio system; a video system; a computer system; a security system; a remote keyless entry system; a global positioning system; a navigation system; a cellular telephone system; or the like. The following description of an example TPMS system is not intended to limit the scope or applicability of the invention in any way. Furthermore, depending upon the application, the RF communication system may utilize different wireless/RF communication techniques, protocols, and methodologies, which may be currently known or developed in the future. For example, the RF communication system may utilize any of the following techniques, protocols, and methodologies, without limitation: Bluetooth; IEEE 802.11 (any variation thereof); general packet radio service ("GPRS"); wireless USB; IEEE 802.15.4 (ZigBee); pulse code modulation ("PCM"); pulse width modulation ("PWM"); pulse position modulation ("PPM"); quadrature amplitude modulation ("QAM"); or the like; and in any practical combination thereof.

FIG. 1 is a side phantom view of a vehicle 100 having an onboard TPMS configured in accordance with an example embodiment of the invention. Vehicle 100 generally includes a TPMS unit 102 that is able to communicate with at least one RF transmitter. Although not shown in FIG. 1, TPMS unit 102 preferably includes at least an RF receiver and a processor. TPMS unit 102 may also include or communicate with a suitably configured user interface, such as a display element, that enables TPMS unit 102 to convey tire pressure information to the driver of vehicle 100.

In this example, a separate and independent RF transmitter is utilized for each tire, and each RF transmitter is realized as a wheel-mounted TPMS sensor/transmitter (identified by reference numbers 104 and 106). In FIG. 1, the other two TPMS sensor/transmitters are hidden from view. Each TPMS sensor/transmitter 104/106 is suitably configured to transmit an RF signal intended for the RF receiver in TPMS unit 102. Thus, although not depicted in FIG. 1, each TPMS sensor/transmitter may include a suitably designed transmit antenna, which may be realized with the valve stem for the respective tire. In practice, each TPMS sensor/transmitter 104/106 measures the internal tire pressure for its associated wheel and generates an RF signal that conveys tire pressure information in a conventional manner. FIG. 1 depicts the RF energy radiated by TPMS sensor/transmitter 104 with reference number 108, and the RF energy radiated by TPMS sensor/transmitter 106 with reference number 110.

The RF receiver of TPMS unit 102 is configured to receive the RF signals radiated by the TPMS sensor/transmitters. Thus, although not depicted in FIG. 1, TPMS unit 102 includes a suitably designed receiver antenna, which may be realized as a simple printed monopole RF antenna located on a circuit board. In the example embodiment described herein, the received RF signals are subjected to processing by the TPMS, which is one example of a suitable onboard vehicle system. In preferred practical embodiments, TPMS unit 100 (and the RF receiver in particular) may be conventional in design and operation, and a conventional TPMS unit need not be modified or customized to support the RF relay element described herein.

The RF signals transmitted by TPMS sensor/transmitters 104/106 are susceptible to electromagnetic field scattering caused by vehicle 100. More particularly, such scattering is caused by the conductive metal body panels, conductive chassis parts, and other features of vehicle 100 that adversely alters the radiation pattern and field strength associated with the RF signals. In conventional TPMSs, such scattering can result in signal strength loss of the RF signals, and the amount of signal loss may vary from one TPMS sensor/transmitter to another, depending upon their location within the vehicle. Variation in received signal strength is undesirable in practical applications because an RF receiver having a high dynamic range (and corresponding increased complexity and cost) is necessary to tolerate such variation.

To address the scattering effect, vehicle 100 may include one or more RF relay elements located proximate to one or more TPMS sensor/transmitters. As described in more detail below, a relay element employed by the TPMS system is preferably a passive device, component, or feature, e.g., a passive RF antenna, a resonant slot, or the like. Each RF relay element is suitably configured to relay the RF signals generated by the TPMS sensor/transmitters to TPMS unit 102. Thus, the RF receiver of TPMS unit 100 is also configured to receive the relayed RF signals provided by the RF relay elements. In practice, an RF relay element reduces signal strength loss of the RF signals by "redirecting" the RF energy away from the conductive parts of vehicle 100. This redirection increases the power of the received RF signals by recapturing RF energy that would otherwise be lost within the conductive framework of vehicle 100. Thus, the RF relay elements result in more reliable wireless communication links between the TPMS sensor/transmitters and the RF receiver, while decreasing the dynamic range of the received signals.

Figure 2:
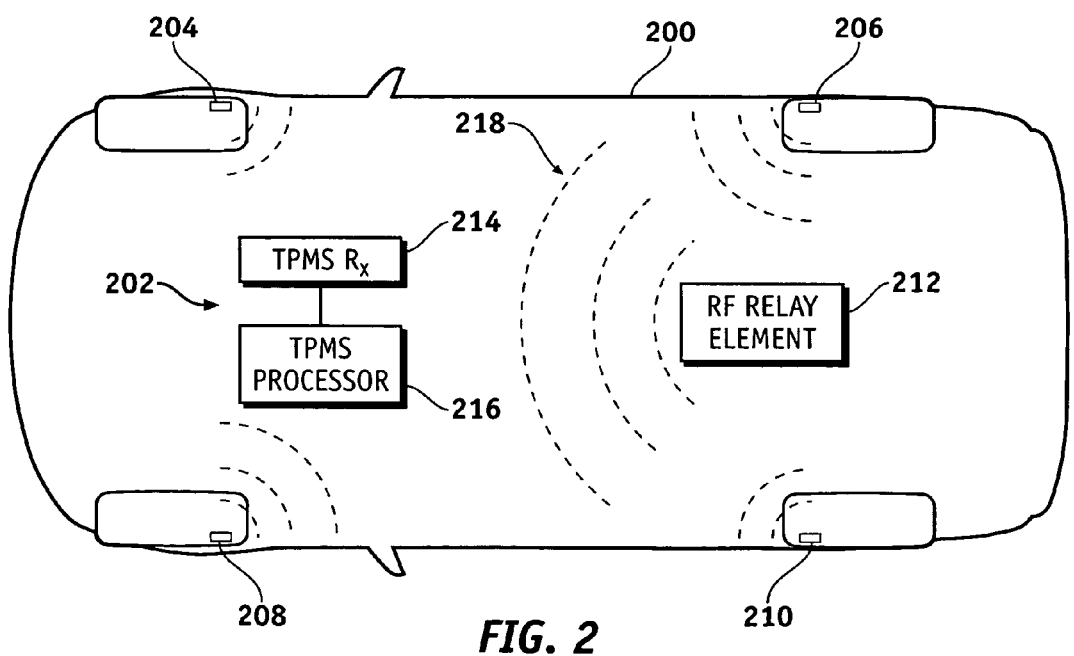
FIG. 2 is a schematic representation of a vehicle with a TPMS configured in accordance with an example embodiment of the invention.

FIG. 2 is a schematic representation of a vehicle 200 with a TPMS configured in accordance with an example embodiment of the invention. Certain features and components of the TPMS system of vehicle 200 are identical, similar, or equivalent to features and components of the TPMS system of vehicle 100, and such common features and components will not be redundantly described in the context of vehicle 200. Briefly, vehicle 200 includes a TPMS unit 202, TPMS sensor/transmitters (identified by reference numbers 204, 206, 208, and 210), and an RF relay element 212. TPMS unit 202 includes a TPMS receiver 214 coupled to a TPMS processor 216.

TPMS processor 216 is configured to process tire pressure information conveyed in the RF signals received by TPMS receiver 214. In practice, TPMS processor 216 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

FIG. 2 represents one example embodiment where a single RF relay element supports more than one TPMS sensor/transmitter. In this regard, RF relay element 212 is configured to relay RF signals transmitted by TPMS sensor/transmitter 206 to TPMS receiver 214, and to relay RF signals transmitted by TPMS sensor/transmitter 210 to TPMS receiver 214. As used herein, signals relayed, transmitted, or generated by an RF relay element are referred to as "relayed RF signals" or "relayed wireless signals." Such relayed RF signals are identified by reference number 218 in FIG. 2.

The configuration shown in FIG. 2 may be appropriate if TPMS unit 202 is located in close proximity to TPMS sensor/transmitters 204/208 such that the RF signals radiated by TPMS sensor/transmitters 204/208 are not degraded by the electromagnetic field scattering caused by vehicle 200. Depending upon the particular application, the topology of vehicle 200, and the relative positioning of the TPMS components, it may be possible for RF relay element 212 to support more than two TPMS sensor/transmitters. In practice, such a configuration is desirable to reduce the deployment cost of the TPMS.

Figure 3:
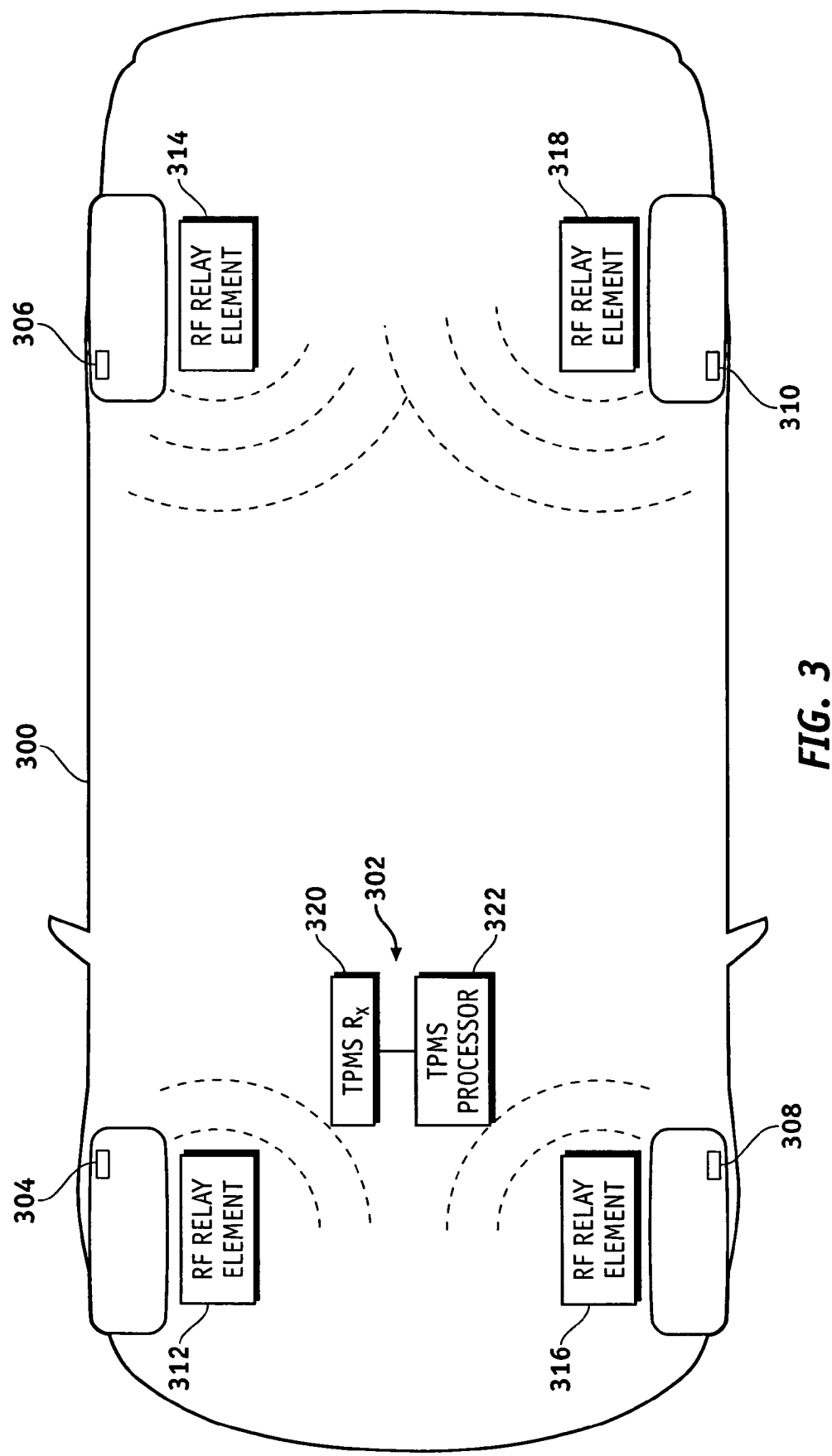
FIG. 3 is a schematic representation of a vehicle with a TPMS configured in accordance with another example embodiment of the invention.

FIG. 3 is a schematic representation of a vehicle 300 with a TPMS configured in accordance with an example embodiment of the invention. Certain features and components of the TPMS of vehicle 300 are identical, similar, or equivalent to features and components of the TPMS of vehicle 100 and/or the TPMS of vehicle 200, and such common features and components will not be redundantly described in the context of vehicle 300. Briefly, vehicle 300 includes a TPMS unit 302, TPMS sensor/transmitters (identified by reference numbers 304, 306, 308, and 310), and RF relay elements (identified by reference numbers 312, 314, 316, and 318). TPMS unit 302 includes a TPMS receiver 320 coupled to a TPMS processor 322.

FIG. 3 represents one example embodiment where each TPMS sensor/transmitter has a corresponding RF relay element. Thus, each RF relay element primarily supports only one TPMS sensor/transmitter, which is located in close proximity to its corresponding RF relay element (of course, in a practical embodiment, a given RF relay element might influence RF energy transmitted from any number of TPMS sensor/transmitters, including those located at other wheels). In this regard, RF relay element 312 corresponds to TPMS sensor/transmitter 304, RF relay element 314 corresponds to TPMS sensor/transmitter 306, RF relay element 316 corresponds to TPMS sensor/transmitter 308, and RF relay element 318 corresponds to TPMS sensor/transmitter 310. In operation, each RF relay element shown in FIG. 3 is suitably configured to relay RF signals transmitted by its respective TPMS sensor/transmitter to TPMS receiver 320.

The configuration shown in FIG. 3 may be appropriate to ensure that TPMS unit 302 receives intended RF signals in a reliable manner, and to reduce the dynamic range of the RF signals received by TPMS receiver 320. Thus, the TPMS of vehicle 300 can be specifically customized and tuned according to the topology and configuration of vehicle 300. For example, RF relay elements that are in close proximity to TPMS receiver 320 (e.g., RF relay elements 312/316) need not be tuned as precisely as other RF relay elements (e.g., RF relay elements 314/318).

A practical onboard RF communication system need not be configured in the manner shown in FIG. 2 or FIG. 3. Indeed, the flexible nature of the invention enables customization of an RF communication system to suit the needs of the particular vehicle and/or the particular application.

As mentioned above, the RF relay element may be a passive component. In other words, the RF relay element need not be powered and need not rely on the vehicle power supply for operation. In practice, the RF relay element will be tuned according to the nominal frequency of the RF signals. For example, conventional TPMSs currently utilize an operating center frequency of 315 MHz (in the United States) or 433.92 MHz (in Europe), and the RF relay element will be suitably designed to resonate at the desired center frequency to facilitate efficient relaying of the RF signals. In addition, the RF relay element may be tuned according to RF characteristics, electromagnetic characteristics, and/or other characteristics of the vehicle in which the TPMS is deployed. For example, the RF relay element may be configured to accommodate the geometry of the vehicle, the composition of the vehicle, the relative locations of the TPMS sensor/transmitters and the TPMS receiver, or the like. Thus, unlike traditional TPMSs, the vehicle itself is considered in the design to establish a reliable communication link between the TPMS sensor/transmitters and the TPMS receiver. Furthermore, the RF relay element may be tuned according to the design and configuration of the TPMS sensor/transmitters, the design and configuration of the TPMS receiver, and/or other operating characteristics or parameters of the TPMS.

Figure 4:
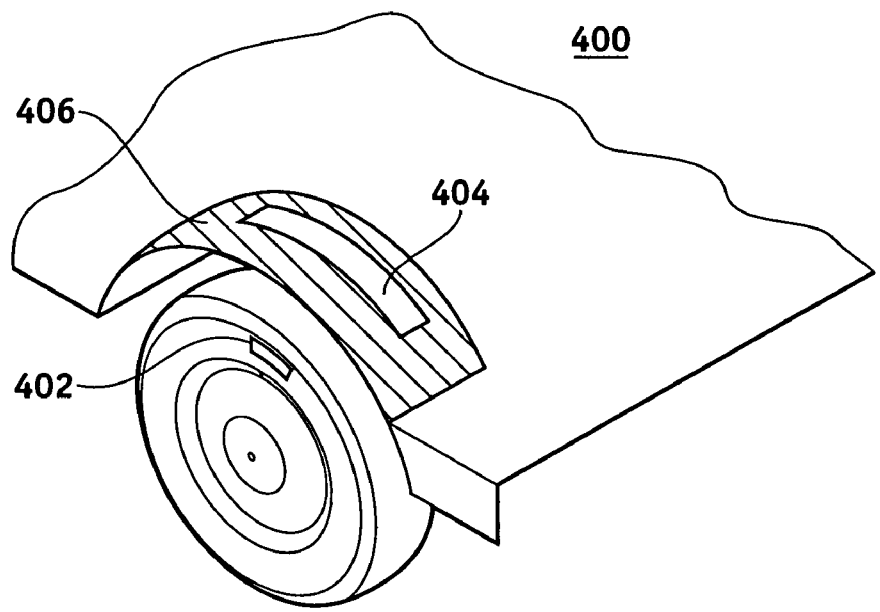
FIG. 4 is a perspective view of a portion of a vehicle having an RF relay element configured in accordance with an example embodiment of the invention.

FIG. 4 is a perspective view of a portion of a vehicle 400 having an RF relay element configured in accordance with an example embodiment of the invention. FIG. 4 also depicts a wheel-mounted TPMS sensor/transmitter 402 associated with the RF relay element. In this embodiment, the RF relay element comprises a resonant slot 404 that is tuned to a desired operating frequency of the TPMS (e.g., the nominal resonant frequency of the RF signal generated by TPMS sensor/transmitter 402). Resonant slot 404 may be formed in any conductive structure, such as a conductive metal panel, of vehicle 400. For example, resonant slot 404 may be formed in a fender or wheel well 406 of vehicle 400 as depicted in FIG. 4.

The location of resonant slot 404 is desirable because it represents an area of relatively high RF current flow associated with the RF energy radiated by TPMS sensor/transmitter 402. In a conventional deployment without the RF relay element, a portion of the RF current flow is dissipated into vehicle 400, which results in loss of signal strength. Resonant slot 404 is suitably shaped and sized to suit the needs of the given application. In one example embodiment, resonant slot 404 is approximately one inch wide and fourteen inches long. This size is suitable for use in a TPMS having an operating frequency of 315 MHz. RF performance simulations of this example embodiment indicated an improvement in received signal strength of more than 3 dB. Accordingly, resonant slot 404 is an effective and practical way to implement an RF relay element for a wireless communication system as described herein.

Figure 5:
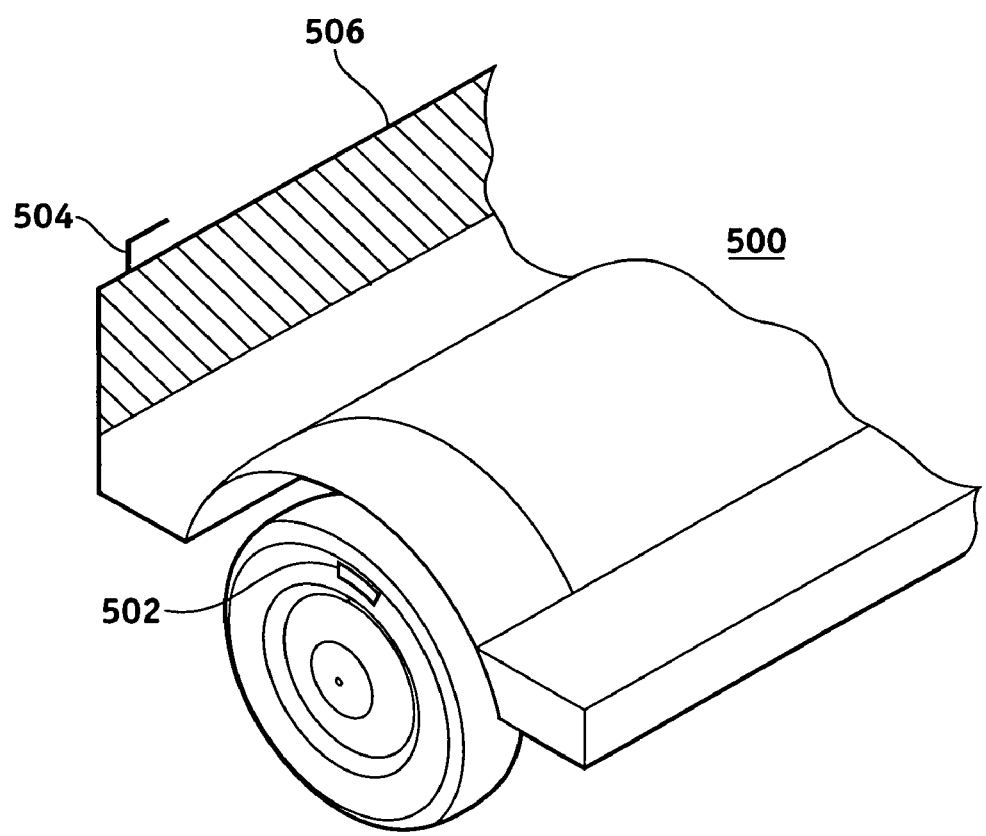
FIG. 5 is a perspective view of a portion of a vehicle having an RF relay element configured in accordance with another example embodiment of the invention.

FIG. 5 is a perspective view of a portion of a vehicle 500 having an RF relay element configured in accordance with another example embodiment of the invention. FIG. 5 also depicts a wheel-mounted TPMS sensor/transmitter 502 associated with the RF relay element. In this embodiment, the RF relay element comprises an RF antenna 504 that is tuned to a desired operating frequency of the TPMS (e.g., the nominal resonant frequency of the RF signal generated by TPMS sensor/transmitter 502). In practice, RF antenna 504 may be a simple monopole antenna comprising a radiating element and a cooperating ground plane, where the radiating element includes a feed where it meets the ground plane. In practice, the radiating element of RF antenna 504 may be formed from a solid conductor (e.g., a copper wire), a thin conductive material etched onto a dielectric mounting element, a flexible conductor formed on a flexible adhesive tape, or the like. In yet other embodiments of the invention, RF antenna 504 may leverage any suitable RF antenna technology, including, without limitation: microstrip; stripline; coaxial; twin lead; coplanar waveguide; and the like.

In this example, a bulkhead 506 of vehicle 500 serves as the ground plane for RF antenna 504 (bulkhead 506 is formed from conductive metal). As mentioned above in connection with resonant slot 404, RF antenna 504 is preferably located in close proximity to the associated TPMS sensor/transmitter to take advantage of the available RF energy. In alternate embodiments, RF antenna 504 may be located in any suitable location between TPMS sensor/transmitter 502 and the TPMS receiver.

RF antenna 504 suitably shaped and sized to suit the needs of the given application. For example, RF antenna 504 may be configured as a quarter wavelength monopole antenna, where the length of the radiating element is approximately one-fourth the wavelength of the desired RF signal. Thus, RF antenna 504 can be suitably tuned such that its resonant frequency corresponds to the nominal center frequency of the desired RF signal. As mentioned above, RF antenna 504 is preferably tuned in accordance with conductive structure located in vehicle 500. In practice, such tuning may include, without limitation: tuning or adjusting the length of the radiating section of RF antenna 504; tuning or adjusting the shape, size, or topology of RF antenna 504; tuning or adjusting the mounting distance of the radiating section relative to the ground plane; selecting the composition or material for the radiating section; selecting the configuration of RF connectors (if any) utilized with RF antenna 504; and/or designing an appropriate matching circuit for RF antenna 504. Of course, RF antenna 504 can be suitably tuned using any number of known techniques to address other electromagnetic and/or RF characteristics of vehicle 500 or the TPMS.

In conclusion, the invention relates to systems and methods for reducing the signal loss (and, therefore, the received signal fluctuating range) between an RF transmitter and an RF receiver of a TPMS. An RF relay element relays RF signals received from the RF transmitter such that the relayed RF signals can be received by the RF receiver. The RF relay element can be in the form of a resonant slot or a simple antenna, where the choice of the particular RF relay element may depend on the geometry of the vehicle. A simple antenna can be located anywhere between the RF transmitter and the RF receiver. A resonant slot can be cut or otherwise formed in a conductive metal panel of the vehicle, such as a fender or a wheel well.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A radio frequency ("RF") communication system for a vehicle, said system comprising:
   an RF receiver configured to receive RF signals for processing by an onboard vehicle system;
   an RF transmitter configured to transmit an RF signal intended for said RF receiver, said RF signal being susceptible to electromagnetic field scattering caused by the vehicle; and
   a resonant slot formed in a conductive panel of the vehicle located proximate to said RF transmitter, said resonant slot being configured to reduce electromagnetic field scattering caused by the vehicle, said reduction in electromagnetic field scattering resulting in reduced signal strength loss of said RF signal.

2. A system according to claim 1, said RF receiver being an onboard RF receiver, and said RF transmitter being an onboard RF transmitter.

3. A system according to claim 1, said resonant slot being tuned according to a frequency of said RF signal.

4. A system according to claim 1, said resonant slot being formed in a conductive metal panel of the vehicle.

5. A system according to claim 1, said resonant slot being tuned according to RF characteristics of the vehicle.

6. A system according to claim 1, said RF transmitter comprising a wheel-mounted tire pressure sensor/transmitter, and said onboard vehicle system comprising a tire pressure monitoring system.

7. An onboard tire pressure monitoring system ("TPMS") for a vehicle, said TPMS comprising:
   a wheel-mounted tire pressure sensor/transmitter configured to transmit a radio frequency ("RF") signal that conveys tire pressure information, said RF signal being susceptible to electromagnetic field scattering caused by the vehicle; and
   a resonant slot formed in a conductive panel of the vehicle located proximate to said wheel-mounted tire pressure sensor/transmitter, said resonant slot being configured to reduce electromagnetic field scattering caused by the vehicle, said reduction in electromagnetic field scattering resulting in reduced signal strength loss of said RF signal.

8. A TPMS according to claim 7, further comprising:
   an onboard RF receiver configured to receive said RF signal; and
   an onboard TPMS processor coupled to said onboard RF receiver, said onboard TMPS processor being configured to process tire pressure information conveyed in said RF signal.

9. A TPMS according to claim 7, said resonant slot being tuned according to a frequency of said RF signal.

10. A TPMS according to claim 7, said resonant slot being formed in a conductive metal panel of the vehicle.

11. A TPMS according to claim 7, said resonant slot being tuned according to RF characteristics of the vehicle.

12. A TPMS according to claim 7, wherein:
    said wheel-mounted tire pressure sensor/transmitter is mounted on a first wheel of the vehicle;

said TPMS further comprises:
- a second wheel-mounted tire pressure sensor/transmitter mounted on a second wheel of the vehicle, said second wheel-mounted tire pressure sensor/transmitter being configured to transmit a second RF signal that conveys tire pressure information, said second RF signal being susceptible to electromagnetic field scattering caused by the vehicle; and
- a second resonant slot formed in a conductive panel of the vehicle located proximate to said second wheel-mounted tire pressure sensor/transmitter, said second resonant slot being configured to reduce signal strength loss of said second RF signal;
- said resonant slot is configured to relay said RF signal transmitted by said wheel-mounted tire pressure sensor/transmitter; and
- said second resonant slot is configured to relay said second RF signal transmitted by said second wheel-mounted tire pressure sensor/transmitter.

13. An onboard wireless communication method for a vehicle, said method comprising:
- transmitting a wireless signal that conveys information for processing by an onboard vehicle system, said wireless signal being susceptible to electromagnetic field scattering caused by the vehicle;
- radiating said wireless signal through a resonant slot formed in a conductive panel of the vehicle to provide a relayed wireless signal in a manner that reduces signal strength loss of said relayed wireless signal, said signal strength loss resulting from said electromagnetic field scattering; and
- receiving said relayed wireless signal.

14. A method according to claim 13, wherein:
- said onboard vehicle system comprises a tire pressure monitoring system; and
- said wireless signal conveys tire pressure information.

15. A method according to claim 14, wherein:
- said transmitting step is performed for a plurality of wireless signals generated by a like plurality of wheel-mounted tire pressure sensor/transmitters; and
- said radiating step is performed for said plurality of wireless signals.

* * * * *